Patented Mar. 12, 1940

2,193,655

UNITED STATES PATENT OFFICE 2,193,655

ACCELERATOR OF VULCANIZATION

Waldo L. Semon, Silver Lake, Ohio, assignor to The B. F. Goodrich Company, New York, N. Y., a corporation of New York No Drawing. Application September 15, 1937
Serial No. 163,990

19 Claims. (Cl. 260—788)

This invention relates to the art of rubber manufacture and has as its chief object to provide a new and improved class of accelerators of vulcanization.

Derivatives of dithiocarbamic acids were among the first known organic accelerators. The dialkyl dithiocarbamates which were first prepared were thought to be very useful, since they are so active that they are capable of inducing vulcanization of rubber even at room temperatures. It was soon discovered, however, that this property was a great disadvantage, since the rubber prevulcanized or "scorched" while it was being mixed, calendered, extruded, or even while it was being stored prior to vulcanization, making such accelerators practically useless for compounding in rubber on an industrial scale. This uncontrollability combined with their high cost resulted in a search for less active materials. Derivatives of monoaryl and alkylaryl dithiocarbamic acids have been proposed as accelerators, but they are subject to the same disadvantages and, in some cases, are even more active than the dialkyl compounds.

The process of this invention consists in vulcanizing rubber in the presence of an arylenethiazyl ester of a diaryl dithiocarbamic acid. Benzothiazyl diphenyl dithiocarbamate is the simplest member of this class which also includes, for example, benzothiazyl esters of ditolyl (ortho, meta, para or mixed), dinaphthyl (alpha, beta or mixed), dixenyl, phenylnaphthyl, phenyl-xenyl, phenyl-cumyl, p-isopropenyldiphenyl, p-allylphenyl-beta-naphthyl, phenyl-p-isopropoxyphenyl, phenyl - p - phenyloxyphenyl, phenyl-p-hydroxyphenyl, di-o-anisyl, phenyl-p-chlorphenyl, phenyl-m-bromphenyl, phenyl-p-dimethylaminophenyl, phenyl-p-methylaminophenyl, phenyl-p-anilinophenyl, phenyl-p-nitrophenyl, phenyl-p-acetylamidophenyl, and other like diaryl dithiocarbamates. The term aryl is therefore to be understood as designating both unsubstituted and substituted monovalent radicals containing an aromatic carbocyclic ring with the free valence on a nuclear carbon atom unless it is specifically limited to hydrocarbon aryl groups. The diarylarylene bis dithiocarbamic acids such as diphenylphenylene bis dithiocarbamic acid are also included in the generic term diaryl dithiocarbamic acid. The substituted benzothiazyl derivatives, especially 6-nitrobenzothiazyl diaryl dithiocarbamates often have even more desirable properties as accelerators than do the unsubstituted benzothiazyl derivatives. The naphthothiazyl, the toluothiazyl, and other arylenethiazyl esters of diaryl dithiocarbamic acids are good accelerators and included within the scope of this invention.

The arylene thiazyl diaryl-dithiocarbamates impart unique desirable properties to rubber compositions. There is practically no tendency for the compositions to vulcanize at temperatures at which rubber is ordinarily processed, but at higher temperatures vulcanization proceeds rapidly to produce well-cured stocks. This unusual combination of properties makes this new class of compounds particularly valuable for use on an industrial scale, since the rigidly controlled processing conditions heretofore necessary for stocks containing rapid-cure accelerators is unnecessary.

The accelerators of this invention are easily prepared by a number of methods. A convenient preparation consists in reacting a 2-halogen arylenethiazole with a metallic diaryl dithiocarbamate. Benzothiazyl diphenyl dithiocarbamate, for instance, may be prepared by reacting 2-chlorbenzothiazole with sodium diphenyl dithiocarbamate. Similarly, 6-nitrobenzothiazyl phenyl-beta-naphthyl dithiocarbamate may be prepared by reacting 2-chloro, 6-nitro benzothiazole with sodium phenyl-beta-naphthyl dithiocarbamate.

As a specific example of one embodiment of the method of this invention, a rubber composition is prepared by mixing rubber 100 parts by weight, zinc oxide 5 parts, stearic acid 1 part, sulfur 3.5 parts, and 6-nitrobenzothiazyl diphenyl dithiocarbamate 0.5 part. The tensile strengths and elongations obtained by curing under different conditions are set forth in the following table:

| Temperature, °F. | Time | Tensile strength | Elongation |
|---|---|---|---|
| | Minutes | Lbs./sq. in. | Percent |
| 240 | 30 | No cure | |
| 240 | 60 | 4020 | 735 |
| 240 | 90 | 3945 | 685 |
| 260 | 30 | 4385 | 755 |
| 287 | 10 | 4030 | 800 |

It will be observed that the composition may be heated for 30 minutes at 240° F. without starting to cure, but that high tensile strength and elongation are obtained in only 10 minutes at 287° F. Similar results are obtained with benzothiazyl phenyl-beta-naphthyl dithiocarbamate, 6-nitrobenzothiazyl phenyl-alpha-naphthyl dithiocarbamate, or indeed any of the accelerators enumerated above.

The term "a benzothiazyl diaryl-dithiocarbamate" is used in the appended claims in a generic sense to include not only benzothiazyl compounds but also substituted benzothiazyl compounds such as nitrobenzothiazyl, and chlorobenzothiazyl diaryl-dithiocarbamates.

It is to be understood that the specific examples given above are merely illustrative of one manner of use of the accelerators of this invention; that other accelerators within the scope of the class herein defined may be substituted for the specific compounds used in the examples; that the accelerators of this invention may be used to vulcanize rubber broadly, including caoutchouc, balata, gutta-percha, synthetic rubber, or natural or artificially prepared latex; that the accelerators may be incorporated in the rubber by mastication or milling, or in the case of latex or other dispersion or solution, by simply dissolving or suspending therein; that the accelerators may be used in admixture with each other or other known accelerators, or with antioxidants, organic acids, amines, softeners, pigments, fillers, etc.; and that the rubber may be vulcanized with the assistance of this new class of accelerators in other manners than that particularly set forth above; specifically, it may be vulcanized in hot air, steam, hot water, etc. The accelerators of this invention may advantageously be used in as low a proportion as 0.1% of the rubber in the composition, in which case 3 or 4% of sulfur is generally required, or as high as 5%, with a much reduced quantity of sulfur.

The scope of this invention is accordingly not to be limited to the specific examples herein set forth, but it is to be limited only as required by the prior art and as indicated in the appended claims.

I claim:

1. The process which comprises vulcanizing rubber in the presence of an arylenethiazyl diaryl dithiocarbamate.

2. The process which comprises vulcanizing rubber in the presence of a benzothiazyl diaryl dithiocarbamate.

3. The process which comprises vulcanizing rubber in the presence of a benzothiazyl di(hydrocarbon-aryl) dithiocarbamate.

4. The process which comprises vulcanizing rubber in the presence of a nitroarylenethiazyl diaryl dithiocarbamate.

5. The process which comprises vulcanizing rubber in the presence of a 6-nitrobenzothiazyl diaryl dithiocarbamate.

6. The process which comprises vulcanizing rubber in the presence of an arylenethiazyl phenyl-aryl dithiocarbamate.

7. The process which comprises vulcanizing rubber in the presence of a nitroarylenethiazyl diphenyl dithiocarbamate.

8. The process which comprises vulcanizing rubber in the presence of 6-nitrobenzothiazyl diphenyl dithiocarbamate.

9. The process which comprises vulcanizing rubber in the presence of 6-nitrobenzothiazyl phenyl-alpha-naphthyl dithiocarbamate.

10. The process which comprises vulcanizing rubber in the presence of 6-nitrobenzothiazyl phenyl-beta-naphthyl dithiocarbamate.

11. The process which comprises heating a mixture of rubber, sulfur, and an arylenethiazyl diaryl dithiocarbamate.

12. A rubber composition which has been vulcanized in the presence of an arylenethiazyl diaryl dithiocarbamate.

13. A rubber composition which has been vulcanized in the presence of a benzothiazyl diaryl dithiocarbamate.

14. A rubber composition which has been vulcanized in the presence of a benzothiazyl di (hydrocarbon-aryl) dithiocarbamate.

15. A rubber composition which has been vulcanized in the presence of a nitroarylenethiazyl diaryl dithiocarbamate.

16. A rubber composition which has been vulcanized in the presence of a nitroarylenethiazyl diphenyl dithiocarbamate.

17. A rubber composition which has been vulcanized in the presence of 6-nitrobenzothiazyl diphenyl dithiocarbamate.

18. A rubber composition which has been vulcanized in the presence of 6-nitrobenzothiazyl phenyl-alpha-naphthyl dithiocarbamate.

19. A rubber composition which has been vulcanized in the presence of 6-nitrobenzothiazyl phenyl-beta-naphthyl dithiocarbamate.

WALDO L. SEMON.